United States Patent [19]

Anderssen et al.

[11] 4,141,945

[45] Feb. 27, 1979

[54] METHOD OF DISPOSING OF PRECIPITATED SILICA

[75] Inventors: Tore Anderssen, Vagsbygd; Kjell Larsen, Sogne, both of Norway

[73] Assignee: Elkem-Spigerverket A/S, Oslo, Norway

[21] Appl. No.: 807,645

[22] Filed: Jun. 17, 1977

Related U.S. Application Data

[63] Continuation of Ser. No. 604,301, Aug. 13, 1975, abandoned, which is a continuation-in-part of Ser. No. 452,826, Mar. 20, 1974, abandoned.

[51] Int. Cl.$^2$ ............................................. C04B 35/64
[52] U.S. Cl. ...................................... 264/63; 106/73.5
[58] Field of Search ................................... 264/63, 117

[56] References Cited

U.S. PATENT DOCUMENTS

| | | | |
|---|---|---|---|
| 2,048,861 | 7/1936 | Haglund | 264/63 |
| 3,525,784 | 8/1970 | Endell | 264/63 |

*Primary Examiner*—Robert F. White
*Assistant Examiner*—John A. Parrish
*Attorney, Agent, or Firm*—Eyre, Mann, Lucas & Just

[57] ABSTRACT

A method of disposing of silica dust precipitated from metallurgical furnaces producing products high in silicon content by making mechanically strong metal oxide pellets with the silica dust as a binder is disclosed.

3 Claims, No Drawings

METHOD OF DISPOSING OF PRECIPITATED SILICA

This is a continuation of applicaton Ser. No. 604,301, filed Aug. 13, 1975, now abandoned, which in turn is a Continuation-In-Part of Ser. No. 452,826 filed Mar. 20, 1974, now abandoned.

The present invention is a method of disposing of the colloidal silica dust precipitated from the smoke of metallurgical processes for the production of metallic silicon or alloys having a high silicon content by using it as a binder for metal oxide pellets.

It is a well known fact of life that the reduction of environmental pollutants frequently results in the collection of materials which have no useful purpose and thus become pollutants themselves. The recovered materials from polluting gases must be disposed of in some way and are frequently dumped at sea thus simply transferring the problem from the air to the water without solving it. It is well recognized throughout industry that any use to which these products can be put is highly beneficial.

In the instant case, the applicants are concerned with the silica dust precipitated from metallurgical processes for the production of materials having a high silicon content, either metallic silicon or silicon alloys. While these dusts must be removed from the smoke from the metallurgical processes in order to meet environmental standards, there are very few known uses for these dusts. Even those uses which are insufficient to use the entire quantity of precipitated dusts recovered and the remaining dusts, which are very fine and colloidal in nature, create a serious disposal problem.

The present invention is a continuation in part of U.S. Patent Application Ser. No. 452,826 filed Mar. 20, 1974 now abandoned.

As is well known in the art, it is frequently desirable to form pellets of metal oxide-containing materials. Typical of these metal oxides are hematite, magnetite, chromium oxide, and manganese dioxide. The pellets are customarily formed by first combining them with a binder in water in conventional manner on a rotary disc or inclined cylinder whereafter the pellets are dried and then sintered in a suitable apparatus such as a shaft furnace, rotary kiln, sintering grate or the like. The binders customarily employed are materials such as bentonite, sulfite lye, molasses, etc.

The applicants have now discovered that the very fine silica dust recovered from metallurgical processes making materials which are high in silicon content can be disposed of by putting them to useful work as binders for those metal oxides. More particularly, the applicants have discovered that these recovered dusts can be admixed with at least one metal oxide and water, formed into a pellet and then the pellet can be sintered at a temperature of 1,300–1,400° C. to make a mechanically strong metal oxide pellet.

In accordance with the present invention, it is only necessary that at least part of the binder is finely divided silicon dioxide dust. The other binders customarily employed may also be used if desired. However, it has been found that when the silicon dioxide dusts recovered from metallurgical processes are used as at least part of the binder, the strength of the metal oxide pellets formed is increased as is their abrasion resistance. The silicon dioxide dust is that dust which is recovered from metallurgical furnaces which produce silicon metal or silicon-containing alloys. This dust is very fine and is frequently referred to as colloidal silicon dioxide. It will generally have a specific surface between about 15 $m^2/g$ and about 25 $m^2/g$. The amount of silica dust binder to be used in accordance with the present invention can be from about 1% to about 5% by weight of the finished pellet.

The amount of water to be added to form the pellets is not critical and need only be sufficient to form the pellets. The amount of water will necessarily vary depending upon the specific characteristics of the metal oxide, the silicon dioxide dust and any other binder used. The amount of water should be sufficient to form cohering pellets but should not be so much that the resulting mass is in the nature of a liquid. With chromium oxide ore and a binder of silicon dioxide dust having a specific surface of about 18 $m^2/g$, it has been found that water in the amount of about 20–25% is acceptable.

The metal oxide pellets of the present invention are utilized in smelting furnace operations. To prevent explosion of the pellets in the furnace, it is necessary that the pellets be mechanically strong. It has been found that the method of the present invention employing precipitated silica as a binder at stated percentages and temperatures yields pellets of sufficient mechanical strength to be used in smelting furnace operations. Since the pellets of the present invention are intended for use in smelting furnace operations, the metal oxides from which the pellets are made may be any of the metal oxides used in smelting furnaces, e.g. hematite, magnetite, chromium oxide, manganese oxide and mixtures of the foregoing.

In accordance with the present invention, a number of different tests were carried out with chromium ore pellets made with water and different binders on an inclined cylinder. Each of the formed pellets was dried and was then sintered in a shaft furnace at temperatures as indicated in the Table. Results of various tests are also given in the Table. The pressure strength is the average pressure in kilograms which the pellets could endure without breaking. This is determined by applying pressure to individual pellets until the pellets break and recording the pounds of pressure at break. The abrasion test is in terms of percent of material which does not pass through a 1 mm sieve (i.e., on 1 mm). This test is carried out by revolving the pellets in a ribbed drum through 5,000 revolutions and thereafter measuring the percent of fines.

TABLE

| Binder | | | pressure strength | pressure strength and abrasion strength of sintered pellets | | | | | |
|---|---|---|---|---|---|---|---|---|---|
| | | | | Sintering Temperature | | | | | |
| % Bentonite | % Sulfite lye | % Silica dust | kgs Dried pellets | about 1300° C | | about 1350° C | | about 1400° C | |
| | | | | pressure kgs | abrasion | pressure kgs | abrasion | pressure kgs | abrasion |
| 1 | 0 | 0 | 9.6 | 51 | 50.2 | 68 | 59.2 | 106 | 70.4 |
| 0.5 | 1 | 0 | 14.4 | 89 | 64.9 | 128 | 70.2 | | |

TABLE-continued

| Binder | | | pressure strength | pressure strength and abrasion strength of sintered pellets | | | | | |
|---|---|---|---|---|---|---|---|---|---|
| | | | | Sintering Temperature | | | | | |
| % Bentonite | % Sulfite lye | % Silica dust | kgs Dried pellets | about 1300° C | | about 1350° C | | about 1400° C | |
| | | | | pressure kgs | abrasion | pressure kgs | abrasion | pressure kgs | abrasion |
| 1 | 0.5 | 3.0 | 23.0 | 154 | 85.0 | 127 | 86.8 | 192 | 89.0 |
| 0 | 1 | 1 | 23.7 | 124 | 63.5 | 196 | 96.7 | 245 | 77.1 |
| 0 | 1 | 5 | 23.9 | 142 | 77.7 | 204 | 86.0 | 249 | 87.8 |
| 0 | 1 | 3 | 22.0 | 142 | 73.5 | 205 | 80.0 | 221 | 83.2 |
| 0 | 0 | 1 | 10.3 | 121 | 74.3 | 182 | 84.3 | 193 | 83.2 |
| 0 | 0 | 3 | 12.8 | 140 | 75.1 | 200 | 85.1 | 210 | 86.7 |
| 0 | 0 | 5 | 13.7 | 145 | 76.2 | 205 | 86.7 | 222 | 86.4 |

As can be seen from the results given in the Table, using silica dust as part of the binder substantially increases the pressure strength which the pellets can endure thereby enabling their use in smelting furnace operations. In most cases it also substantially increases the abrasion resistance. It should be noted that the pressure strength of the pellets is increased not only in the finish sintered pellets but also in the unsintered dried pellets.

It will be understood that the claims are intended to cover all changes and modifications of the preferred embodiments of the invention, herein chosen for the purpose of illustration, which do not constitute departures from the spirit and scope of the invention.

What is claimed is:

1. A method of forming mechanically strong metal oxide pellets to be used in smelting furnace operations from the silica dust recovered from the smoke of metallurgical processes for the production of metallic silicon or silicon-containing alloys and having a specific surface between about 15 $m^2/g$ and 25 $m^2/g$ by using it as a binder for making mechanically strong metal oxide-containing pellets for use in smelting furnaces comprising:

(a) recovering silica dust having a specific surface between about 15 $m^2/g$ and 25 $m^2/g$ from metallurgical processes for the production of metallic silicon or silicon-containing alloys;

(b) admixing said silica dust with at least one metal oxide selected from the group consisting of hematite, magnetite, chromium oxide and manganese dioxide utilizable in a smelting furnace and with water, said silica dust being present in an amount of from about 1% to about 5% and the water being present in sufficient amount to form cohering pellets;

(c) forming the admixture of step (b) into pellets; and (d) sintering the pellets at a temperature of from 1,300° C. to about 1,400° C.

2. The method of claim 1 wherein said silica dust is the only binder.

3. The method of claim 1 wherein said silica dust is combined with at least one other binder selected from the group consisting of sulfite lye, bentonite and molasses.

* * * * *